(12) United States Patent
Vieira

(10) Patent No.: US 8,142,729 B2
(45) Date of Patent: Mar. 27, 2012

(54) DRIVE SYSTEM AND ACTUATION METHOD

(75) Inventor: Valmor Neves Vieira, Sao Mateus do Sul (BR)

(73) Assignee: Petróleo Brasileiro S.A.-Petrobras, Rio de Janeiro (BR)

( * ) Notice: Subject to any disclaimer, the term of this patent is extended or adjusted under 35 U.S.C. 154(b) by 214 days.

(21) Appl. No.: 12/520,336

(22) PCT Filed: Dec. 20, 2007

(86) PCT No.: PCT/GB2007/004904
§ 371 (c)(1),
(2), (4) Date: Sep. 16, 2009

(87) PCT Pub. No.: WO2008/075058
PCT Pub. Date: Jun. 26, 2008

(65) Prior Publication Data
US 2010/0005794 A1    Jan. 14, 2010

(30) Foreign Application Priority Data
Dec. 20, 2006 (BR) ..................... 0605354

(51) Int. Cl.
*B01J 8/08* (2006.01)
*B01J 19/00* (2006.01)
*B01J 8/00* (2006.01)
*F16D 37/00* (2006.01)
*F16D 31/00* (2006.01)
*F16D 31/02* (2006.01)

(52) U.S. Cl. .......... 422/210; 422/129; 422/187; 60/327; 60/484

(58) Field of Classification Search ............ 422/210, 422/129, 187; 60/327, 384, 387, 484, 487
See application file for complete search history.

(56) References Cited

U.S. PATENT DOCUMENTS

| 1,460,067 A | 6/1923 | Laird |
| 4,690,213 A * | 9/1987 | Stannard et al. ............. 166/84.4 |
| 4,944,867 A | 7/1990 | Mundstock et al. |
| 5,068,010 A | 11/1991 | Mundstock et al. |
| 5,210,962 A | 5/1993 | Jones |

FOREIGN PATENT DOCUMENTS

BR    8 300 425    9/1984
(Continued)

OTHER PUBLICATIONS

English translation of Vieira et al (BR 86001866 A), which was published Nov. 10, 1987 and was provided in an IDS.*

(Continued)

*Primary Examiner* — Walter D Griffin
*Assistant Examiner* — Natasha Young
(74) *Attorney, Agent, or Firm* — Nixon & Vanderhye PC

(57) ABSTRACT

The present invention relates to a drive system (100) applied to the mechanism for discharging solids and regulating flows of a reactor vessel (300), reducing the degree of freedom between the components of the distributor element, increasing the definition of its movements and consequently providing more uniform and precise flow discharge. The drive system (100) comprises an actuator piston (101) affixed to a fixed support (400), a transmission rod (103) and a drive rod (106) connected to the scrapper rings (301). The transmission (103) and drive (106) rods are connected by a vertical joint (105).

10 Claims, 3 Drawing Sheets

FOREIGN PATENT DOCUMENTS

| | | |
|---|---|---|
| BR | 8300425 | 9/1984 |
| BR | 8601866 | 11/1987 |
| BR | 8606369 | 7/1988 |
| GB | 934 229 | 8/1963 |
| GB | 934229 | 8/1963 |
| GB | 986 149 | 3/1965 |
| GB | 986149 | 3/1965 |

OTHER PUBLICATIONS

International Search Report for PCT/GB2007/004904, mailed Apr. 29, 2008.

Written Opinion of the International Searching Authority for PCT/GB2007/004904, mailed Apr. 29, 2008.

* cited by examiner

DRIVE SYSTEM AND ACTUATION METHOD

This application is a National Phase of International Application No. PCT/GB2007/004904, filed 20 Dec. 2007, which designates the U.S., and claims priority to Brazilian Application No. PI0605354-8, filed 20 Dec. 2006, the entire contents of each of which are hereby incorporated by reference.

BACKGROUND OF THE INVENTION

The present invention relates to an improved drive system. In particular, to a drive system that drives the mechanism for discharging solids and regulating flows in a reactor vessel. The invention reduces the degree of freedom of movement of the distributor element and increases the definition of its movement, as a consequence imparting more uniform discharge and more precise flow.

The invention herein presented is directly applicable to components transmitting movement to the scraper rings described in patents BR 8300425 and BR 8601866.

DESCRIPTION OF RELATED ART

In the petroleum industry, due to the high economic value of its product, it is common to implement processes aimed at recovering residual organic material.

In this respect the petroleum industries have for a long time been developing processes permitting extraction of byproducts still possessing economic value but which are found in materials having low aggregate contents, such as shales and bituminous sands.

One of such processes is known in the industry as shale retorting, described in patent BR 8606369. By means thereof it is possible to obtain substantially-useful liquid and gaseous hydrocarbons.

Said patent reveals equipment destined for cracking heavy hydrocarbons contained in particulate material arising from other processes, specifically pyrobituminous shales.

Such a process may be concisely described as a retorting process occurring within a large cylindrical vessel fed continuously with pyrobituminous shale particles through an opening located at its upper extremity. The thermochemical reaction of the shale occurs in an intermediate region of such a vessel and residues produced by the reaction move under gravity to the lower region of the vessel whereon they are removed by a discharge and flow control mechanism. Thermal and chemical reactions promote the release of gases and vapours. Such vapours and gases, in reality vapours of light hydrocarbons having commercial value, are collected in the upper region of the vessel.

In the initial phases of the process precautions are taken such that there is no segregation of shale particles in the formation of the bed and thus, consequently, there is homogeneous temperature distribution in each section of the reactor, ensuring a continuous and uniform thermochemical reaction in all particles in each section of such reactor vessel.

In this respect improvements have already been proposed to devices of the retorting equipment, principally those acting in the initial stages of the cracking process, which aim to ensure homogeneous distribution of particles in the process of formation of the retort bed, obtaining consequential benefits of a complete thermochemical reaction. Efforts have been directed towards resolving feeding and distribution problems, among others.

In the final retorting stages the significance has been discovered of the discharge and flow control mechanism, it being found that said mechanism is also directly associated with control of the thermochemical reaction of the shale occurring immediately above said component, in the region of the reactor vessel or retorting vessel referred to in the technical milieu as a retorting zone.

At least two typical problems have been identified: one occurs successively, and another sporadically, however both occasion loss of productivity. The two problems have been detected in spite of all improvements, previously proposed and revealed by patents BR 8300425 and BR 8601866, to the drive components and devices responsible for the discharge process.

Loss of homogeneity of granulometric distribution, of permeability, and of distribution of temperatures has been shown in the same section of the retorting bed, which preferably should not occur. Consequent upon detailed investigation to locate the origin of such problems resulting from changes in the disposition of particles within the reactor vessel, it has been discovered that homogeneity of such disposition was being lost in an ascending sense, that is to say from the discharge mechanism to the particle distributor device. The problem may be better comprehended through an understanding of the stages of the overall process.

In the upper region of such large reactor vessels there is a distributor device for solid particles, in this case pyrobituminous shale. The significance of this device in the retorting process is directly associated with control of formation of a uniform bed having homogeneous thermal permeability. Properly implementing such a distribution will ensure homogeneous distribution of particles, and as a consequence ensure homogeneous temperature distribution in the same section of the reactor, ensuring a uniform thermochemical reaction of all particles in the same section of the retorting bed.

Such constant concern for homogeneous distribution of particles arises from the consequences which the formation of an irregularly-disposed bed may occasion. It has been found that agglomeration of particles of similar sizes results in regions possessing differing permeability and, consequently, differing temperatures, and may even cause cessation of clearing the bed due to formation of structures known as "bridges" and "cages".

It is known in the present state of the art that concentration of particles having similar dimensions through the bed of the reactor vessel occasions temperature dispersion in the pyrolysis zone, consequently forming a retorting section possessing unequal temperatures.

The process is continuous, that is to say there is constantly a volume of particulate material being homogeneously distributed in the upper part of the vessel, in an intermediate section the thermochemical reaction is constantly occurring, and in the lower section of the vessel there is constantly an environment of continuous discharge, working at a discharge capacity equal to the capacity of charging and distribution.

Such equilibrium between the rates of the input device and that of output helps to maintain ideal reaction conditions in the intermediate section of the vessel.

It had been anticipated that the improvements introduced into the movements of scraper rings described in patent BR 8300425 would yield a constant cycle very proximate to the depiction of a dodecagon or any other polygon equivalent to the number of actuator pistons installed in the discharge mechanism. In this manner, the greater the number of pistons installed in said mechanism, the closer the cycle of movement of such scraper rings would be to a circular circumference.

Performance of the discharge mechanism was however unsatisfactory and universal joints fitted to the components transmitting movement between the pistons and the scraper rings were replaced by vertical pivots, as described in patent BR 8601866.

However, independently of the number of actuator pistons installed, the pertinence was observed of small lateral displacements of such scraper rings of the discharge mechanism, causing alteration to the regularity of discharge of particles.

Such localised alteration of the rate of discharge causes interference between successive sections of the mass in the reactor vessel, permitting excessive non-generalised displacement of particles of one region of said reactor vessel with respect to another. Such irregularity in rate of discharge of the lowest section of the vessel causes displacement of particles of successively-higher layers in the same location, with consequent misalignment of previously-disposed sections.

Such localised non-generalised displacement favours conditions for the formation of segregated regions. The reactor vessel then behaves in the manner of a large mass subdivided into various pockets of differing density, each pocket having a given dimension of concentrated particulate material, presenting a different permeability rate, consequently some zones rapidly attain the temperature required for the thermochemical reaction whilst others remain below said temperature.

As already mentioned, in an attempt to resolve such problems, the universal joints fitted to the extremities of the intermediate rods were replaced by vertical pivots, together with implementation of further adjustments to the movement of the scraper rings through modifications proposed to the digitalised drive of the pistons. This did not, however, completely resolve the problem.

From observations made in the field, the mechanical origin of the non-generalised lack of control of discharge was identified. The intermediate rods fitted with universal joints or vertical pivots, at a given moment in the actuation cycle of successive hydraulic pistons, permit compensation of movements, one cancelling another, altering the final movement of the scraper rings. Such compensation of movements between the various intermediate rods of the discharge mechanism is aggravated by the possibility of small lateral displacements of the hydraulic pistons cited in said document BR 8300425.

The most serious problem is seizure of the discharge mechanism which, in spite of occurring only sporadically, occasions great prejudice to production. This problem may occur due to a combination of the compensations made possible by the universal joints or by the vertical pivots, associated with the lateral freedom of movement of the hydraulic pistons and by the restrictions on angulation of the rods occasioned by the entry orifices in the wall of the reactor vessel.

In order to overcome such problems of non-generalised alteration to the flow of granulometric material and seizure of the entire mechanism, the present improvement to the drive system of the mechanism for discharging solids and regulating flow was developed.

The invention hereinafter described arises from continuous investigation, the approach having the objective of maintenance of particle homogenisation within the reactor vessel such as to achieve equalisation of thermal load in each section during the entire thermochemical process.

The present invention has the objective of providing an improvement applicable to the drive system of the granulometric discharge mechanism of solid particles for the purposes of discharging reactors, blast furnaces, burners, dryers or storage silos.

Other advantages which said improvement to the drive system of the present invention proposes to achieve are listed hereinafter:
 a Homogenisation of discharge of particulate material;
 b Ensuring that said scraper rings always describe a precise movement corresponding to a regular polygon;
 c Elimination of intersection of particles from successive sections of the reactor vessel;
 d Ensuring that homogenisation achieved in formation of each layer of particles in the reactor vessel remains unchanged until the moment of discharge;
 e Elimination of possible compensations of movements between the diverse movable components of the discharge mechanism;
 f Elimination of the possibility of any compounding of movements between the diverse movable components of the mechanism occasioning complete seizure of the discharge mechanism;
 g Increasing the efficiency of the thermochemical reaction;
 h Increasing the processing rate of the retorting unit.

SUMMARY OF THE INVENTION

The present drive system of the mechanism for discharging solids and regulating flow has been developed after investigations having the objective of reducing the cost and increasing the efficiency of retorting processes through elimination of all possibilities of occurrence of granulometric segregation during clearing of granular product or of formation of bridges within the body of the reactor vessel.

In this respect the invention proposes a new drive system cancelling out any compensation of movements between the diverse universal joints comprising the actuation of such discharge mechanism and eliminating the possibility of seizure of the rods at the external environment/internal environment interface of the reactor.

The present invention may be applied to any mechanism distributing granular material.

Each retorting equipment usually comprises 6 (six) or more drive units, each unit comprising components known in the art such as joints, transmission rods, vertical pivots, drive rods and hydraulic pistons, wherein when such hydraulic pistons are sequentially actuated they impart a circular movement to an array of concentric rings in the discharge section of the reactor.

In short the drive system proposed herein is furnished by an array of actuator pistons affixed to supports disposed around the reactor vessel. Such pistons are affixed by means of a vertical joint, said joint being affixed to each actuator piston. One extremity of each actuator piston is fitted with a transmission rod passing through the wall of said reactor vessel by means of an aperture having the form of a slot. Each transmission rod is connected to a respective drive rod of the scraper rings by means of a vertical pivot, said vertical pivot always being situated within a perimeter determined by the wall of the reactor.

The present invention provides in one aspect a drive system for driving scraper rings of a reactor vessel of the type comprising six or more drive units each comprising hydraulic pistons which can be sequentially actuated to impart a circular movement to an assembly of concentric scraper rings in the discharge section of the reactor vessel, said drive system comprising:
 an actuator piston affixed to a fixed support by means of a vertical joint;

a transmission rod provided at the end of the actuator piston proximate the reactor vessel and passing through an aperture in the wall of the reactor vessel;

a drive rod for driving the scraper rings, said drive rod being connected to the transmission rod by a vertical pivot, wherein said vertical pivot is within a perimeter described by the wall of the reactor vessel.

Preferably, the drive system has said vertical joint affixed at an intermediate zone of the actuator piston. Preferably, the drive system has said aperture in the form of a slot and said slot has a length equivalent to the angular displacement of said transmission rod.

Preferably, there is provided a drive system wherein said vertical pivot is located at a distance from the centre of said scraper rings equivalent to 85%-95% of the radius of the reactor vessel.

Preferably, there is provided a drive system wherein said vertical pivot, during a movement cycle, does not exceed the perimeter described by the wall of the reactor vessel.

Preferably, there is provided a drive system wherein said transmission rod has a length that is at least 50% of the radius of the scraper rings.

Preferably, there is provided a drive system further comprising a flexible seal affixed to the external wall of the reactor vessel and surrounding part of the transmission rod.

Preferably, said flexible seal has a portion affixed to the wall of the reactor vessel running around said aperture, and another portion attached to said transmission rod, thereby eliminating a requirement for pressurisation.

The present invention describes in a second aspect a method for actuating the above mentioned drive system, which method comprises rotating said hydraulic piston about said vertical joint such as to move said scraper rings.

The invention may comprise a drive system of the mechanism for discharging solids and regulating flow provided for retorting equipment which may comprise six or more drive units, wherein each drive unit comprises components known in the art, such as joints, transmission rods, vertical pivots, drive rods and hydraulic pistons, wherein when such hydraulic pistons are sequentially actuated they impart a circular movement to an assembly of concentric rings in the discharge section of the reactor, specifically to the mechanism of discharge and flow control, wherein each drive assembly is characterised by being provided with an actuator piston (101) affixed to a fixed support (400) by means of a vertical joint (102), said joint being affixed at an intermediate zone of said actuator piston (101); the extremity of actuator piston (101) proximate to the retorting vessel (300) is provided with transmission rod (103) passing through the wall of the reactor vessel by means of an aperture (104) in the form of a slot, being connected to drive rod (106) of scraper rings (301) by means of a vertical pivot (105), said vertical pivot always being situated within a perimeter determined by the wall of said reactor vessel (300).

The drive system may be such that the vertical pivot (105) is located at a distance from the centre of said scraper rings (301) equivalent to 85%-95% of the radius of the reactor vessel.

The drive system may be such that the vertical pivot (105), during a movement cycle, does not exceed a perimeter determined by the wall of the reactor vessel (300).

The drive system may be such that the length of said transmission rod (103) is not less than 50% of the radius of said scraper rings (301).

The drive system may be such that the aperture (104) presents a slot of length equivalent to the angular displacement of transmission rod (103).

The drive system may be such that affixed to the external wall of vessel (300) and surrounding part of said transmission rods (103) there is a flexible seal (107) following the angular movement of said transmission rod, said flexible seal (107) having a portion affixed to wall (300) of the reactor vessel running around said aperture (104), the other portion being attached to rod (103), eliminating a requirement for pressurisation.

BRIEF DESCRIPTION OF THE DRAWINGS

The present invention will be described, by way of example only, in greater detail below, together with the drawings hereinafter listed, in which.

DETAILED DESCRIPTION OF THE INVENTION

Figure 1:
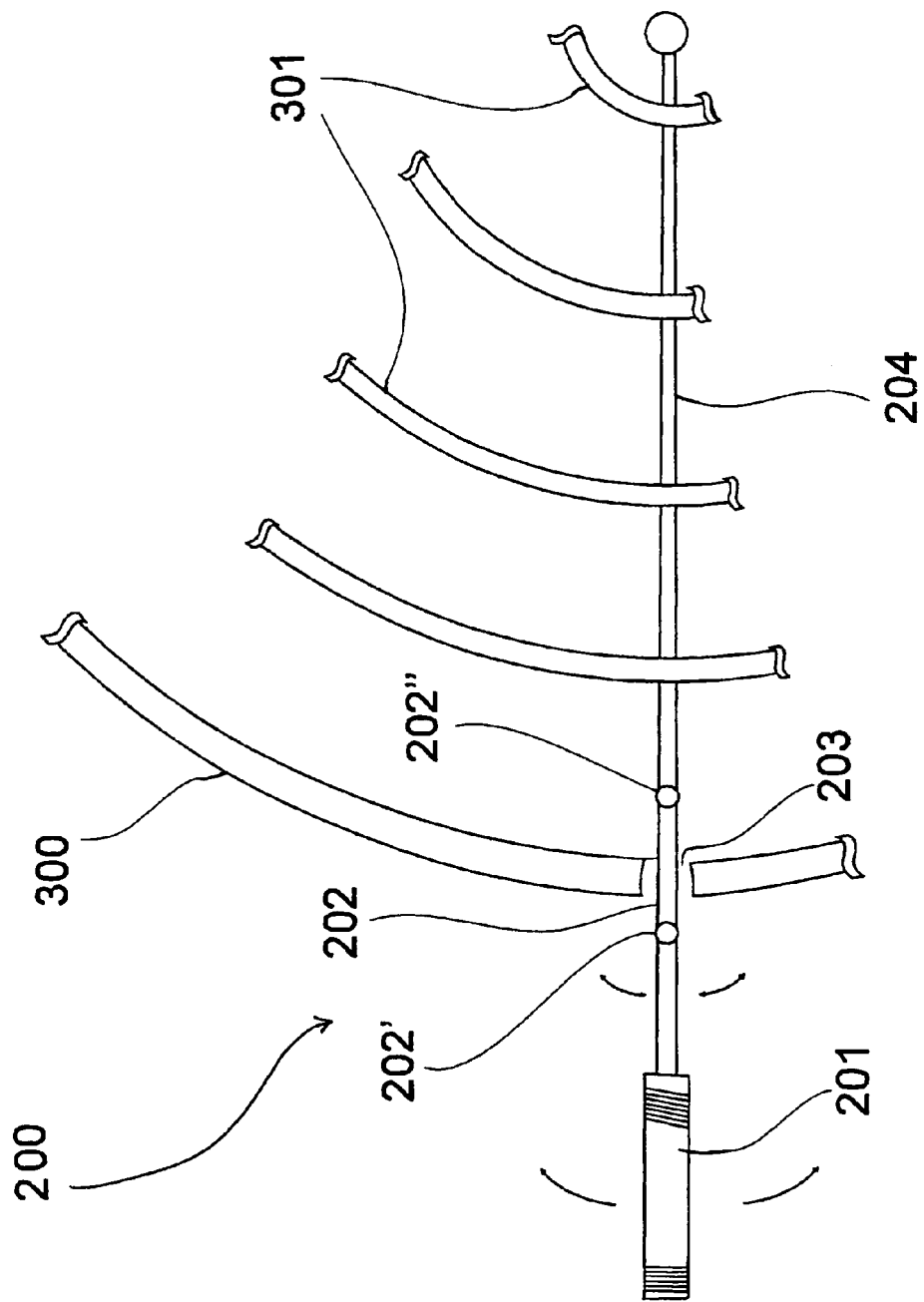
FIG. 1 depicts a diagrammatic cross-section seen from above of part of the drive of the discharge mechanism of the PRIOR ART.

For better comprehension of the present invention it is necessary to understand the actuating principle previously adopted. According to that shown schematically in FIG. 1, the actuator (200) of the distributor mechanism of the prior art comprises an intermediate rod (202) interconnecting drive rod (204) of scraper rings (301) and an actuator piston (201) through an orifice (203) in the reactor vessel (300). Said intermediate rod (202) is jointed at a point between the external wall of said vessel (300) and piston (201) by means of a first joint (202') and at another point between the internal wall of said vessel (300) and drive rod (204) by means of a second joint (202"). Such disposition, having two degrees of freedom of the actuator components of the discharge mechanism, imparts a small lateral movement to actuator piston (201).

The total number of actuator pistons (201) is defined such that variation in porosity of the bed during discharge occurs homogeneously throughout the circular cross-section of the reactor vessel. This signifies that the greater the number of pistons (201) provided in the equipment, the more the scraper rings (301) will tend to describe a perfect circumferential movement. The retorting equipment in question customarily employs 12 actuator pistons and the movement described by said scraper rings should closely follow a regular dodecagon.

In spite of FIG. 1 solely showing one actuator array (200), having the objective of facilitating comprehension, the discharge mechanism in reality usually operates with a minimum of 12 actuator pistons (201). During one discharge cycle of said scraper rings (301) the sequential movement of each piston (201) interacts with all other pistons generating compensations between the many intermediate rods (202), preventing the rings describing a perfect dodecagonal movement per cycle, together with the possible occurrence of total seizure.

In this respect investigation has been directed towards development of a novel actuator system wherein reaction to the action of each piston may be better absorbed by the other components of the discharge mechanism, not giving rise to any change in the movement determined to be described by said scraper rings (301).

Figure 2:
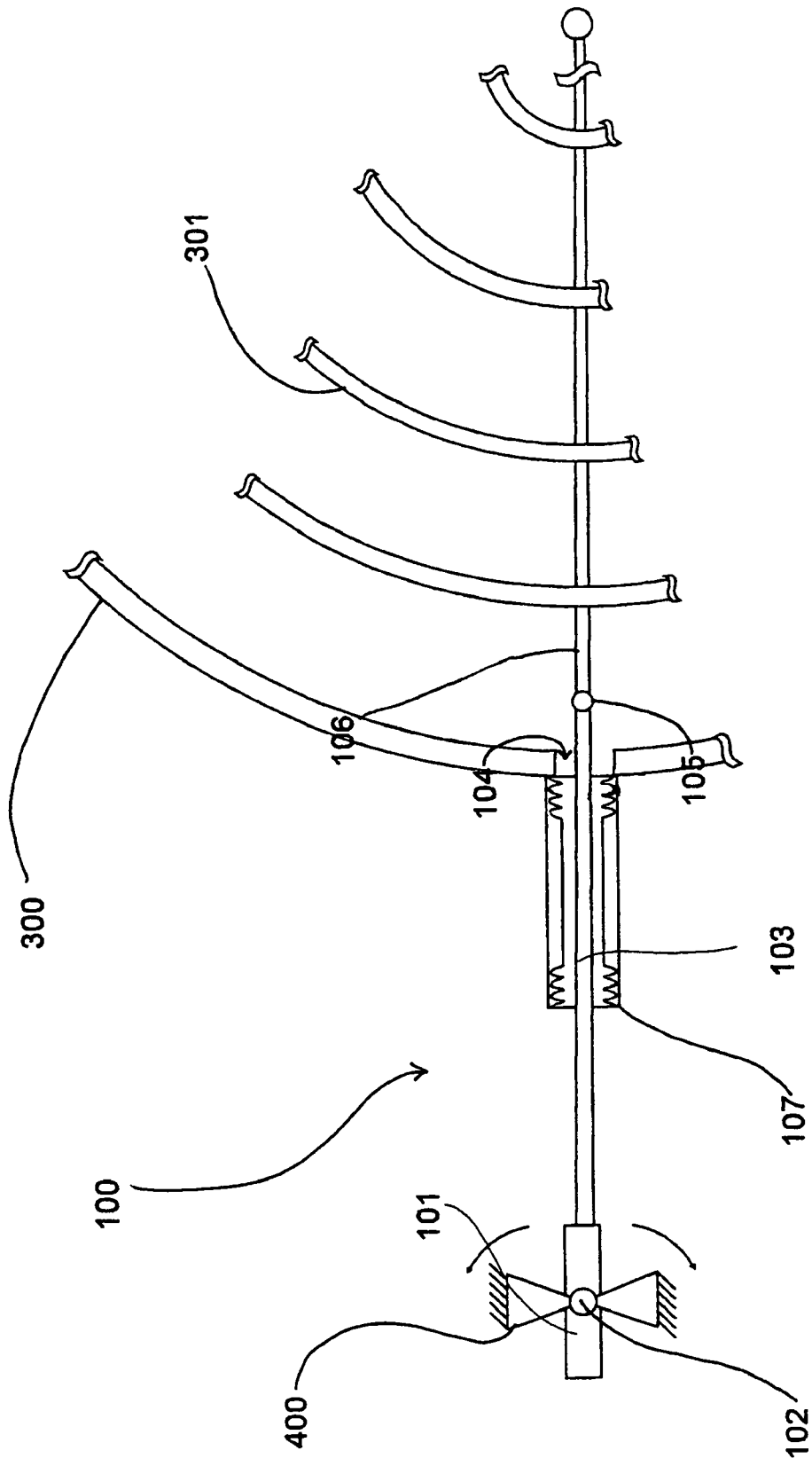
FIG. 2 depicts a diagrammatic cross-section seen from above of part of the drive system of the present invention.

As shown in FIG. 2, being a diagrammatic cross-section seen from above of part of the drive system of the mechanism for discharging solids and controlling flow, it may be observed that the present invention basically comprises the following elements: vertical joint (102), actuator piston (101), transmission rod (103), vertical pivot (105) and drive rod (106) per each actuator assembly.

The major development presented by the object of the present invention is that each drive unit may operate in synchrony with the other units comprising such discharge mechanism, mutually absorbing the reactions acting in the system without the movement described by each cycle of said scraper rings (301) being altered in relation to the design.

In addition, in FIG. 2 the disposition of assembly of the components shown may be observed. In this manner, taking said figure as a basis, we have: actuator piston (101) affixed to fixed support (400) by means of vertical joint (102). Said joint is affixed at an intermediate zone of actuator piston (101) such as to permit the latter to realise an angular movement parallel to the base plane of the retort equipment (not shown) during the cycle of operation of the discharge mechanism.

The extremity of actuator piston (101) proximate to the reactor vessel is provided with transmission rod (103), said rod of defined length passing through the wall of retorting vessel (300) by means of aperture (104) preferably having the form of a slot, being connected to drive rod (106) of said scraper rings (301) by means of vertical pivot (105).

Three parameters can be considered in relation to the dimensional proportions of the design, that is to say:

1 Vertical pivot (105) must preferably be located at a distance from the centre of said scraper rings (301) equivalent to 85%-95% of the radius of the reactor vessel such that, during the movement cycle of said scraper rings, such vertical pivot (105) does not exceed a perimeter determined by the wall of vessel (300).

Figure 3:
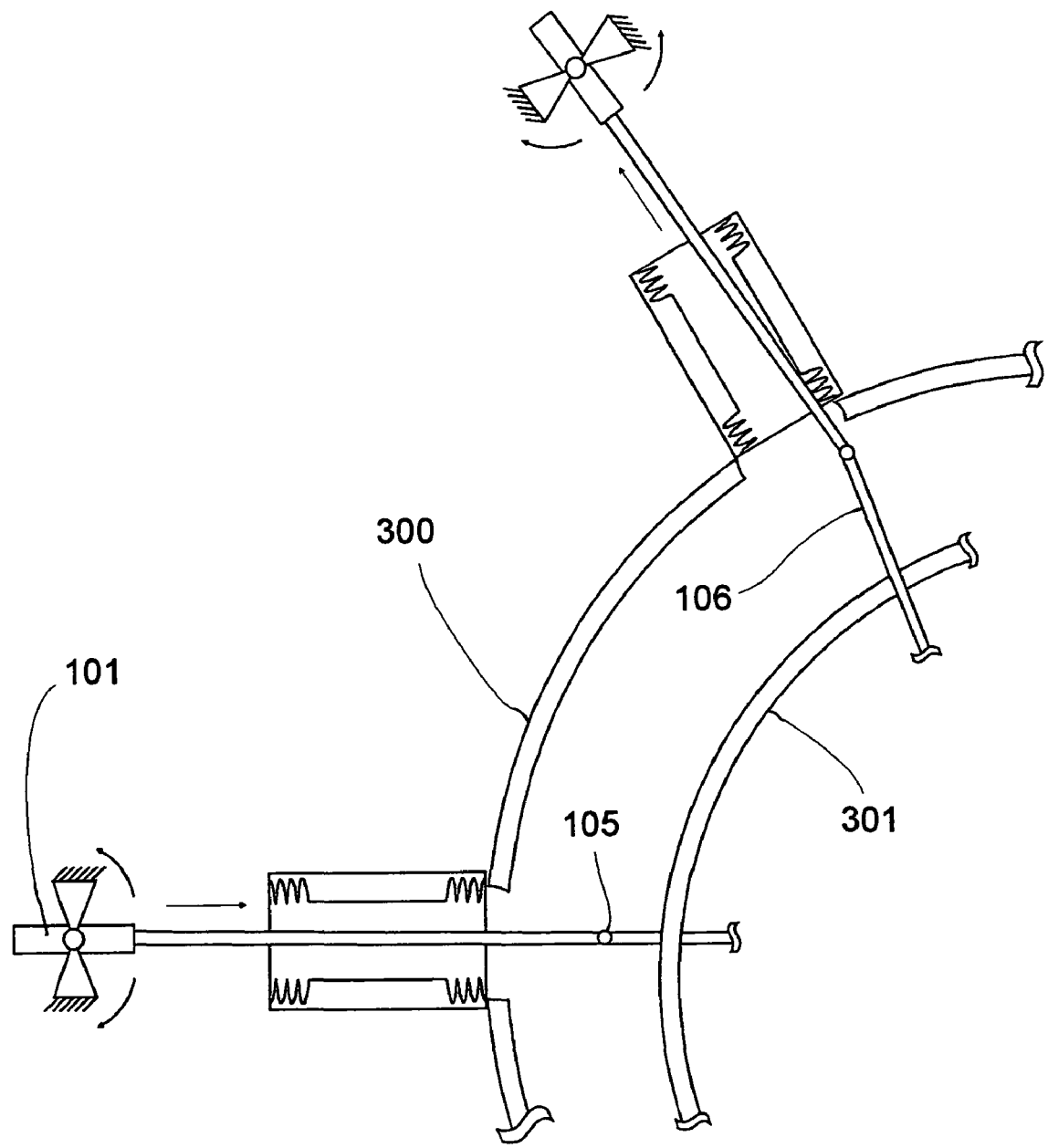
FIG. 3 depicts a diagrammatic representation showing typical compounding of movements of the actuator elements.

2 The length of said transmission rod (103) must preferably not be less than 50% of the radius of said scraper rings (301) because by virtue of sequential actuation of such pistons (101), which impart a circular movement to said scraper rings, the other transmission rods (103) are drawn into an angular movement in conformity with the diagram of FIG. 3, until their respective pistons (101) are also actuated. Should transmission rods (103) be very short, such angular movement of those the respective pistons (101) whereof are not actuated would be very great, causing angular inertia, interfering with the precision of movement of said scraper rings.

In this manner it is preferable that pistons (101) be provided with vertical joints (102) and that said joints be affixed at an intermediate zone of piston (101) such as to permit angular movement of each drive unit (100) of the mechanism for discharging solids and controlling flow.

Finally, said aperture (104) in the wall of the reactor vessel (300) preferably presents a slot of length equivalent to the angular displacement of said transmission rod (103).

Affixed to the external wall of vessel (300) and surrounding part of said transmission rods (103) there is preferably a flexible seal (107) following the angular movement of said transmission rod, isolating the lower sector of the reactor vessel from the external environment. Said novel flexible seal (107) has a portion thereof affixed to the wall (300) of the reactor vessel, running around said aperture (104), the other portion being attached to rod (103). Such innovation has led to significant advantages in sealing, eliminating a requirement for pressurisation.

The drive system (100) may be installed in any mechanism of granular material discharge or flow control in shale reactors and similar without requiring alteration of other constructive dispositions of the vessel.

The present invention has been described herein making reference to its preferred embodiments. It must nevertheless be clear that said invention is not limited to such embodiments and those skilled in the art will immediately perceive that alterations and substitutions may be made within the inventive concept herein described.

The invention claimed is:

1. A drive system for driving scraper rings of a reactor vessel of the type comprising six or more drive units each comprising hydraulic pistons which can be sequentially actuated to impart a circular movement to an assembly of concentric scraper rings in the discharge section of the reactor vessel, said drive system comprising:
    an actuator piston affixed to a fixed support by means of a vertical joint;
    a transmission rod provided at the end of the actuator piston proximate the reactor vessel and passing through an aperture in the wall of the reactor vessel;
    a drive rod for driving the scraper rings, said drive rod being connected to the transmission rod by a vertical pivot, wherein said vertical pivot is within a perimeter described by the wall of the reactor vessel.

2. A drive system according to claim 1, wherein said vertical joint is affixed at an intermediate zone of the actuator piston.

3. A drive system according to claim 1, wherein said aperture is in the form of a slot.

4. A drive system according to claim 3, wherein said slot has a length equivalent to the angular displacement of said transmission rod.

5. A drive system according to claim 1, wherein said vertical pivot, during a movement cycle, does not exceed the perimeter described by the wall of the reactor vessel.

6. A drive system according to claim 1, wherein said transmission rod has a length that is at least 50% of the radius of the scraper rings.

7. A drive system according to claim 1, further comprising a flexible seal affixed to the external wall of the reactor vessel and surrounding part of the transmission rod.

8. A drive system according to claim 3, wherein part of said flexible seal is affixed to the wall of the reactor vessel running around said aperture, and an other part is attached to said transmission rod, thereby eliminating a requirement for pressurization.

9. A drive system according to claim 1, wherein said vertical pivot is located at a distance from the centre of said scraper rings equivalent to 85%-95% of the radius of the reactor vessel.

10. A method of driving the drive system of claim 1, said method comprising rotating said hydraulic piston about said vertical joint such as to move said scraper rings.

* * * * *